United States Patent [19]

Delaval et al.

[11] Patent Number: 5,157,823
[45] Date of Patent: Oct. 27, 1992

[54] APPARATUS FOR SUPPORTING A MACHINE TOOL ON A ROBOT ARM

[75] Inventors: Jacques Delaval, Palaiseau; Guy Lienhart, Limeil Brevannes; Jean-Yves M. Nioche, Saint Maurice Montcouronne; Jean-Marie Pontier, Evry, all of France

[73] Assignee: Societe Nationale d'Etude et de Construction de Moteurs d'Aviation (S.N.E.C.M.A.), Paris, France

[21] Appl. No.: 592,523

[22] Filed: Oct. 4, 1990

[30] Foreign Application Priority Data

Oct. 4, 1989 [FR] France ................ 89 12956

[51] Int. Cl.$^5$ ............................. B25J 15/04
[52] U.S. Cl. .................... 29/26 R; 248/667; 408/714; 414/743; 901/29; 901/45
[58] Field of Search ............ 29/568, 26 A, 26 R; 408/714; 248/587, 590, 606, 607, 609, 611, 659, 667; 414/743; 901/29, 41, 42, 43, 45

[56] References Cited

U.S. PATENT DOCUMENTS

| | | |
|---|---|---|
| 3,749,508 | 7/1973 | Schukrafft . |
| 3,984,006 | 10/1976 | Takeyasu et al. . |
| 4,243,923 | 1/1981 | Whitney et al. . |
| 4,543,032 | 9/1985 | Leverett et al. ............ 29/568 X |
| 4,660,274 | 4/1987 | Goumas et al. ............ 29/568 |
| 4,822,200 | 4/1989 | Berner . |

FOREIGN PATENT DOCUMENTS

| | | |
|---|---|---|
| 3710688 | 10/1988 | Fed. Rep. of Germany . |
| 2555083 | 5/1985 | France . |
| 2639573 | 6/1990 | France . |
| 0929430 | 5/1982 | U.S.S.R. ................ 901/43 |
| 2013535 | 8/1979 | United Kingdom . |

Primary Examiner—Z. R. Bilinsky
Attorney, Agent, or Firm—Bacon & Thomas

[57] ABSTRACT

An apparatus for supporting a machining tool on a robot arm is disclosed having first and second support members with the second support member attached to the first support member by torsion bar elements so as to be movable with respect to the first member about an axis in a single degree of freedom. The first support member is attached to the end of the robot arm and the machining tool is attached to the second support member.

The torsion bar element interconnecting the first and second support members has end portions larger than a connecting portion extending between them. One end portion is fixedly attached to one of the support members and the other end portion is fixedly attached to the other support member. The torsion bar elements are generally cylindrical in configuration and are dimensioned such that the diameters of the end portions are between seven and ten times the diameter of the connecting portion. The torsion bar elements are located such that their longitudinal axes are coincident with the axis of movement of the second support member.

9 Claims, 3 Drawing Sheets

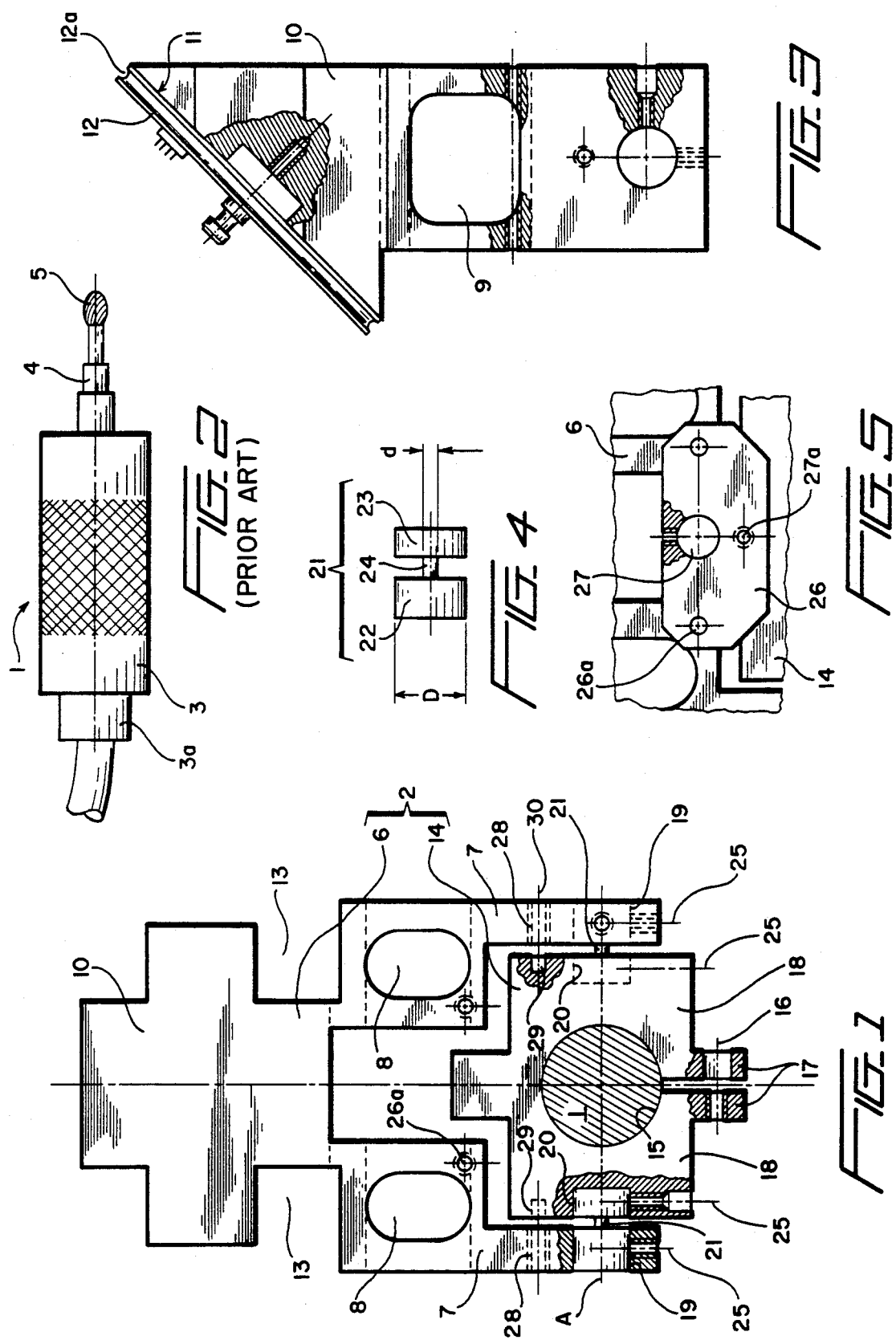

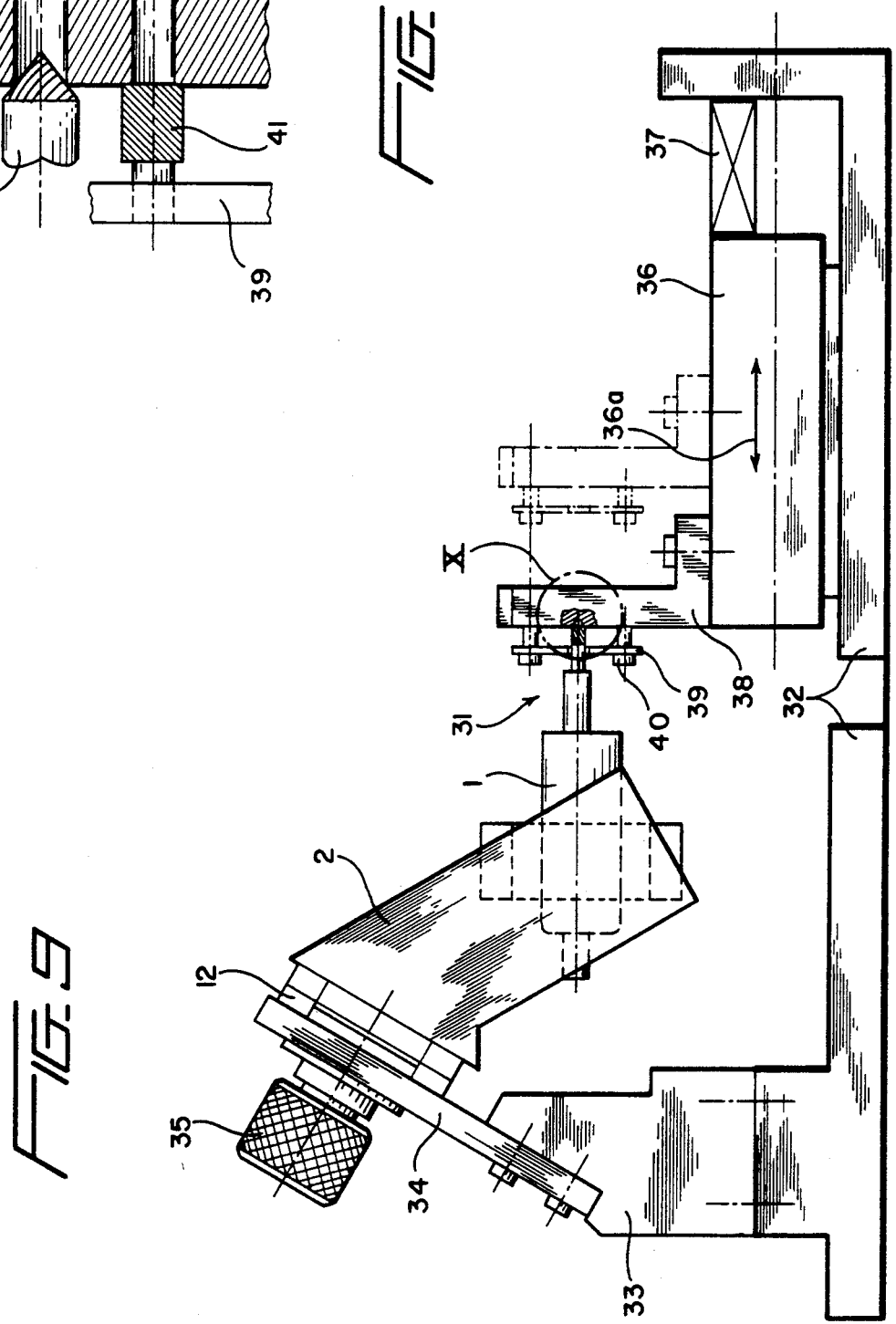

APPARATUS FOR SUPPORTING A MACHINE TOOL ON A ROBOT ARM

BACKGROUND OF THE INVENTION

The present invention relates to an apparatus for supporting a machine tool, more particularly such an apparatus for supporting a milling head on the end of a movable robot arm.

French Patent 2,639,573 describes a device for supporting a machine tool on a robot arm wherein the connection may be either rigid, or movable with several degrees of freedom. This device comprises a flexible support having one degree of freedom of the tool holder relative to the end of the robot arm. This device allows the adjustment of the force on the machining tool such that it applies a constant force to the part being machined.

French Patent 2,555,083 discloses a device for automatic robot machining wherein the machine tool is suspended on a gimbal joint on a carriage which is fastened to the robot manipulator arm.

SUMMARY OF THE INVENTION

An apparatus for supporting a machining tool on a robot arm is disclosed having first and second support members with the second support member attached to the first support member by torsion bar elements so as to be movable with respect to the first member about an axis in a single degree of freedom. The first support member is attached to the end of the robot arm and the machining tool is attached to the second support member.

The torsion bar element interconnecting the first and second support members has end portions larger than a connecting portion extending between them. One end portion is fixedly attached to one of the support members and the other end portion is fixedly attached to the other support member. The torsion bar elements are generally cylindrical in configuration and are dimensioned such that the diameters of the end portions are between seven and ten times the diameter of the connecting portion. The torsion bar elements are located such that their longitudinal axes are coincident with the axis of movement of the second support member.

The invention also encompasses mechanical stops interposed between the first and second support members to limit their relative movement, as well as sensors to measure the distances moved between the support members. The weights of the two supporting members and the machine tool are such that the center of gravity of the assembly lies on the axis of movement of the second support member.

The apparatus improves over the known devices by eliminating any rotary free-hinge links between the support members. The improved distribution of the weights allow the position of the center of gravity of the apparatus to be located on an axis through which the forces pass, resulting in high speed machining capabilities and the elimination of spurious dynamic and machining effects in multiple positions of the machining apparatus.

BRIEF DESCRIPTION OF THE FIGURES

FIG. 1 is a front elevational view of the supporting apparatus according to the present invention.

FIG. 2 is a side elevational view of a known machine tool utilized with the invention illustrated in FIG. 1.

FIG. 3 is a side elevational view of the first supporting member of the device illustrated in FIG. 1.

FIG. 4 is a front view of the torsion spring element utilized with the present invention.

FIG. 5 is a partial, front view illustrating the positions of the stops and measuring sensors in the device of FIG. 1.

FIG. 9 is a side elevational view of an adusting device used to adjust the prestressing forces on the apparatus according to the present invention.

FIG. 10 is an enlarged, detailed view of the portion X shown in FIG. 9.

DETAILED DESCRIPTION OF THE PREFERRED EMBODIMENT

Figure 6:
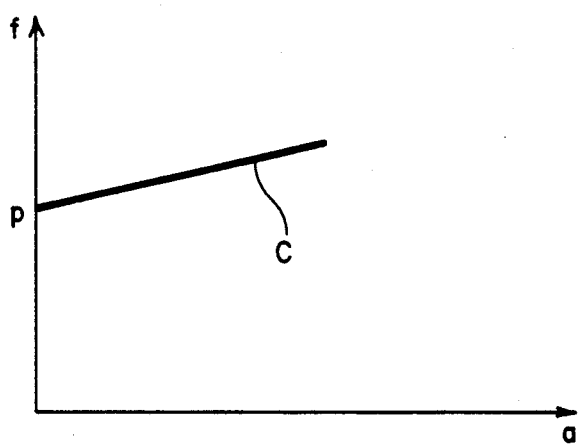
FIGS. 6, 7 and 8 are graphs illustrating the functional curves of the forces acting on the machine tool when used with the supporting apparatus of the invention.

The supporting apparatus according to the present invention is intended to be used with a known type of robot having a mobile arm at the end of which the supporting apparatus is mounted. The supporting apparatus, in turn, bears a machining tool, such as milling tool, to accurately machine a predetermined pattern, such as a chamfer, on mechanical workpieces. The supporting apparatus 2 comprises a first support member 6 and a second support member 14. The first support member 6 is attached to the end of the movable robot arm, while the machine tool 1 is attached to the second support member 14.

The machine tool 1, which may be of a known design, as illustrated in FIG. 2, and comprises a main body 3 housing a drive motor which, as is well known in the art, rotates a chuck 4 in which is mounted a milling tool 5. The main body 3 is connected to a source of power by connecting plug 3a.

The first supporting member 6 of the supporting apparatus 2, as can best be seen in FIG. 1, has a pair of generally depending side leg portions 7 that are spaced apart such that the second supporting member 14 is located between the leg portions 7. The first support member 6 also defines lightening openings 8 and 9, which extend from front to rear and side to side, respectively, in order to lighten the overall weight of this member. Upper portion 10 of the first support member 6 has a slanted upper face 11 to which a known connecting device 12 is attached and which, in turn, attaches the first support member 6 to the end of a movable robot arm (not shown). Connecting device 12 may also define a peripheral groove 12a which may be utilized to attach the supporting device to a storage rack when the assembly is disconnected from the robot arm. First support member 6 may also define generally laterally facing recesses 13 to further lighten the overall weight of this member.

The second support member 14 has leg portions 18 defining a generally central opening 15 in which the machine tool 1 is clamped. This is achieved by passing a bolt along axis 16 through openings defined by lugs 17 such that, by tightening the bolt, the leg portions 18 can be brought closer together, thereby clamping the machine tool in opening 15.

Depending legs 7 define aligned openings 19 which are coaxial with respect to axis A. Adjacent portions of the second support member 14 define openings 20 which are of similar size to openings 19 and, when the support members are properly located, are adjacent thereto.

The second support member 14 is attached to the first support member 6 by a pair of torsion bar elements 21, illustrated in FIG. 4. As can be seen, the torsion bar elements 21 each comprise first and second end portions 22 and 23, each of generally cylindrical configuration having a diameter D. The end portions 22 and 23 are connected by a connecting portion 24, being shorter than the end portions and having a generally cylindrical configuration with a diameter d. The portions are dimensioned such that diameter D is between seven and ten times the diameter d.

The end portions 22 and 23 of the torsion bar elements 21 are each fixedly attached to the first support member 6 and the second support member 14 by inserting the end portions in the respective openings 19 or 20. They may be fixedly attached by use of locking screws 25 extending through the respective support member and engaging the respective end portions 22 or 23. The torsion bar element 21 may be formed from a variety of materials and should be chosen such that its mechanical strength and elastic deformation properties enable it to perform the function of a torsion spring.

Once the first and second support members have been assembled, the second support member 14 may move only about axis A with respect to the first support member 6, a single degree of freedom. The locations of the torsion spring elements 21 are such that their longitudinal axes are coincident with the axis A. By providing a torsion spring effect, the forces acting on the milling tool 5 during the machining operations may cause relative movement between the second support member and the first support member and the milling tool 5 will exert a substantially constant force on the workpiece.

The support apparatus 2 is designed such that, for a maximum supportable weight on the robot arm, the larger portion of the weight is represented by the second support member 14. Also, the center of gravity of the assembly, when the machine tool 1 is attached to the second support member 14, is located on the axis A which extends through the torsion spring members 21. These weight distributions make it possible to prevent vibration effects during the machining operation which might otherwise cause scratching on the machined surfaces. The response curve characterizing the torsion springs 21 is determined as a function of the value of the chamfer to be cut on the workpieces and the position precision of the workpiece edge.

A plate 26 may be attached to the front and back sides of the first support member 6 via screws extending through openings 26a. As best seen in FIG. 5, one plate 26 may have a mechanical stop 27 attached thereto which bears against the second support member 14 to prestress the torsion spring members 21. The opposite plate 26 may have a measuring sensor 27a attached thereto to sense and control the relative position variations between the first support member 6 and the second support member 14. These positions may correspond to the variations in the milling tool 5 and may be calibrated with a force measurement. The sensor 27a may also be used during training trajectory programing operations.

The value of the prestressing force to be applied to the torsion spring members 21 using the stop 27 may be determined as a function of the dimensions of the chamfer to be made and the position accuracy of the workpiece edge where the chamfer is to be made.

Figure 7:
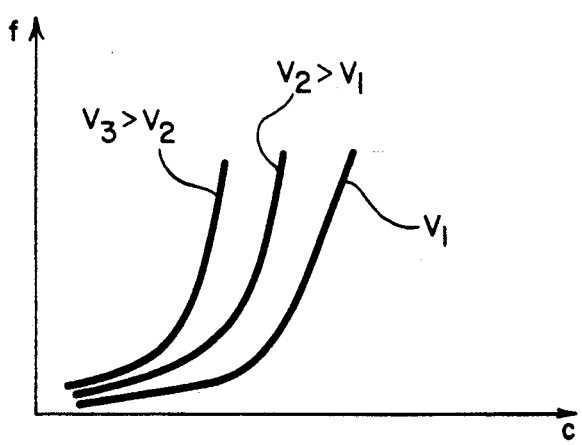
Figure 8:
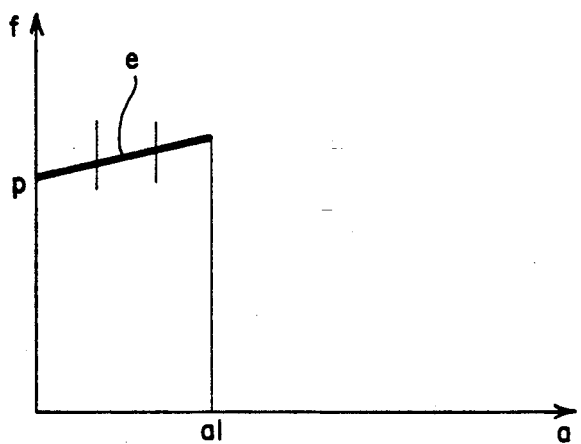

The design requirements just described are illustrated in the graphs shown in FIGS. 6, 7 and 8. As shown in FIG. 6, the prestressing force p of the torsion spring members 21 leads to a typical force curve c exerted on the tool as a function of its displacement a. The prestressing force p makes it possible to carryout the machine work at high forces f even for a relatively low displacement value a of the tool. The use of a high stress force level f promotes stable tool operation.

FIG. 7 illustrates typical curves for stress forces f exerted on the machine tool as a function of the chamfer value c at various tool feed rates $V_1$, $V_2$ and $V_3$. From this drawing, it can be seen that dimension of the chamfer c is slightly sensitive to a small stress variation f and that the choice of the high stress level f, discussed above, necessarily involves the use of a high feed rate V.

From these discussions, it can be concluded that the spring stiffness of the torsion spring members 21 is generally determined so as to generate a small stress f variations; the "quasi constant" stress load f leads to a "profile monitoring" type tool trajectory which makes it possible to work with broad tolerances on the geometry of the work parts, as well as on the programmed trajectories; the trajectory programming is simplified by using the "point to point learning" mode; use of the measuring sensor 27a makes it possible to accurately adjust the value of the tool displacement at each learning point; and the measuring sensor 27a may also be used as a device for applying the robot's trajectory to the tool force f.

The graph shown in FIG. 8 illustrates the relationship of the scope e of the operation of the machine tool 5 within a programed displacement $a_1$ in regard to stress force f.

To prevent accidental damage to the torsion spring elements 21, a mechanical stop may also be placed between the first and second support members. As illustrated in FIG. 1, this stop may comprise threaded openings 28 formed through the legs 7 of the first support member 6 and smooth openings 29 formed in opposite sides of the second support member 14. A pin screw 30 may be threaded into the openings 28 such that it may engage the openings 29.

The supporting apparatus according to the invention has been used to conduct machining operations on aeronautical workpieces, in particular super alloy parts for aircraft engines which included the production of chamfers of approximately 0.5 mm, in which a force of 1 to 4N was applied to the tool. A tool displacement rate of from 5 to 10 to 100 mm per second was used and the axis of the machine tool 5 always remains in a position perpendicular to a plane bisecting the workpiece edge and the axis A always remained parallel to the tangent of the trajectory described by the milling tool end. The value of the chamfer machine is determined, for each application and for a given tool and material, as a result of the selection of the implementation parameters, the feeding rate and the stress applied. The choice of these parameters for a given chamfer enables accuracy on the order of plus or minus 0.1 mm and a surface condition with a value of less than 3.2 CLA micrometers.

FIG. 9 illustrates the method for preliminarily adjusting the supporting apparatus according to the invention. To carry out these adjustments, the machine tool 1 is placed in the second support member 14 and the first support member 6 is attached to fixed support plate 34 via a known support wheel 35. Support plate 34 is fixedly attached to support 33 which, in turn, is affixed to frame 32 of the adjusting bench 31.

The adjusting bench 31 also has an adjustable carriage 36 whose position in the direction of arrows 36a may be fixedly adjusted by an adjusting wedge 37 or by any other known means having a vernier adjustment. Carriage 36 has a centering support 38 attached thereto, to which is mounted a support ring 39 via screws 40. As shown in more detail in FIG. 10, the supporting ring 39 of the centering support 41 defines a hole 42. By placing the end of the milling tool 5 in alignment with the hole 42, adjustments may be carried out regarding the positions of the axis A relative to the end of the robots arm, and to also adjust the milling tool pressure by regulating the prestressing force of the torsion spring members 21 on the supporting apparatus 2.

The foregoing description is provided for illustrative purposes only and should not be construed as in any way limiting this invention, the scope of which is defined solely by the appended claims.

We claim:

1. Apparatus for supporting a machine tool on a movable mechanism, such as a robot arm, comprising:
   a) a first support member adapted to be attached to the movable mechanism;
   b) a second support member;
   c) means to fixedly attach the machine tool to the second support member; and,
   d) attaching means to attach the second support member to the first support member such that the second member is movable with respect to the first support member about an axis in a single degree of freedom, said attaching means including at least one torsion bar element, wherein the at least one torsion bar element comprises first and second end portions fixedly attached to the first and second support members, respectively, and a connecting portion connecting the first and second end portions, the connecting portion having smaller cross-sectional dimensions than the first and second end portions, wherein the connecting portion is generally cylindrical in shape with a diameter d and wherein each of the first and second end portions are generally cylindrical in configuration and have a diameter D such that D is between 7 d and 10 d.

2. The apparatus according to claim 1 wherein the length of the cylindrical connecting portion is no greater than either of the lengths of the first and second end portions.

3. The apparatus according to claim 1 wherein the first support member has spaced apart side portions and wherein the attaching means is operatively interposed between the side portions and the second support member such that the second support member is located between the side portions and is movable about an axis extending through the side portions.

4. The apparatus according to claim 1 further comprising lightening openings defined by the first support member.

5. The apparatus according to claim 1 wherein the attaching means includes means to attach the second support member to the first support member such that the center of gravity of the apparatus lies on the axis about which the second support element is movable.

6. The apparatus according to claim 1 further comprising at least one mechanical stop means operatively interposed between the first and second support members to define limits of the amount of relative movement between the first and second support members.

7. The apparatus according to claim 1 further comprising means operatively interposed between the first and second support members to apply a prestressing force to the at least one torsion bar element.

8. The apparatus according to claim 1 further comprising sensor means operatively interposed between the first and second support members to sense the amount of relative movement between the first and second support members.

9. The apparatus according to claim 1 further comprising means to attach the first support member to the movable mechanism, wherein said means further defines a groove adapted to engage a support rack to support the apparatus when it is detached from the movable mechanism.

* * * * *